US010529353B2

(12) United States Patent
Maziewski et al.

(10) Patent No.: US 10,529,353 B2
(45) Date of Patent: Jan. 7, 2020

(54) RELIABLE REVERBERATION ESTIMATION FOR IMPROVED AUTOMATIC SPEECH RECOGNITION IN MULTI-DEVICE SYSTEMS

(71) Applicant: Intel Corporation, Santa Clara, CA (US)

(72) Inventors: Przemyslaw Maziewski, Gdansk (PL); Adam Kupryjanow, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 25 days.

(21) Appl. No.: 15/837,223

(22) Filed: Dec. 11, 2017

(65) Prior Publication Data

US 2019/0043514 A1    Feb. 7, 2019

(51) Int. Cl.

| | |
|---|---|
| *G10L 21/0208* | (2013.01) |
| *G10L 15/10* | (2006.01) |
| *G10L 15/26* | (2006.01) |
| *G10L 15/34* | (2013.01) |
| *G10L 25/03* | (2013.01) |
| *G10L 15/20* | (2006.01) |

(52) U.S. Cl.
CPC .......... *G10L 21/0208* (2013.01); *G10L 15/10* (2013.01); *G10L 15/26* (2013.01); *G10L 15/34* (2013.01); *G10L 25/03* (2013.01); *G10L 15/20* (2013.01); *G10L 2021/02082* (2013.01)

(58) Field of Classification Search
CPC ..... G10L 15/22; G10L 15/26; G10L 21/0208; G10L 2021/02082; G10L 15/20; G10L 15/10; G10L 15/34; G10L 13/00
See application file for complete search history.

(56) References Cited

U.S. PATENT DOCUMENTS

2016/0232914 A1 *   8/2016   Liang ................. G10L 21/0208
2018/0173999 A1 *   6/2018   Renard ................ G06F 17/279

FOREIGN PATENT DOCUMENTS

| CN | 110010152 A | 7/2019 |
|---|---|---|
| DE | 102018125628 A1 | 6/2019 |

OTHER PUBLICATIONS

Senoussaoui et al. "SRMR variants for improved blind room acoustics characterization", Oct. 28, 2015, IEEE-WASPAA 2015 https://www.researchgate.net/publication/282997179 (Year: 2015).*

* cited by examiner

*Primary Examiner* — Yogeshkumar Patel
(74) *Attorney, Agent, or Firm* — Jaffrey Watson Mendonsa & Hamilton LLP

(57) ABSTRACT

A mechanism is described for facilitating multi-device reverberation estimation according to one embodiment. An apparatus of embodiments, as described herein, includes detection and capture logic to facilitate a microphone of a first voice-enabled device of multiple voice-enabled devices to detect a command from a user. The apparatus further includes calculation logic to facilitate a second voice-enabled device and a third voice-enabled device to calculate speech to reverberation modulation energy ratio (SRMR) values based on the command, where the calculation logic us further to estimate reverberation times (RTs) based on the SRMR values. The apparatus further includes decision and application logic to perform dereverberation based on the estimated RTs of the reverberations.

20 Claims, 11 Drawing Sheets

RELIABLE REVERBERATION ESTIMATION FOR IMPROVED AUTOMATIC SPEECH RECOGNITION IN MULTI-DEVICE SYSTEMS

FIELD

Embodiments described herein relate generally to data processing and more particularly to facilitate reliable reverberation estimation for improved automatic speech recognition in multi-device systems.

BACKGROUND

Conventional techniques for reverberation time measurements involve omnidirectional loudspeaker and microphone, where both the loudspeaker and microphone are required to be separated by a reasonable distance (such as more than a meter). Thus, these conventional techniques are not capable of being implement in a single device where the microphone and loudspeaker are close to each other. Similarly, conventional techniques are impractical when implemented in a multi-device setup where one device is playing an excitation signal, while another one is measuring a response as they are using artificial audio signals like tones or sweeps. Thus, conventional techniques are intrusive.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
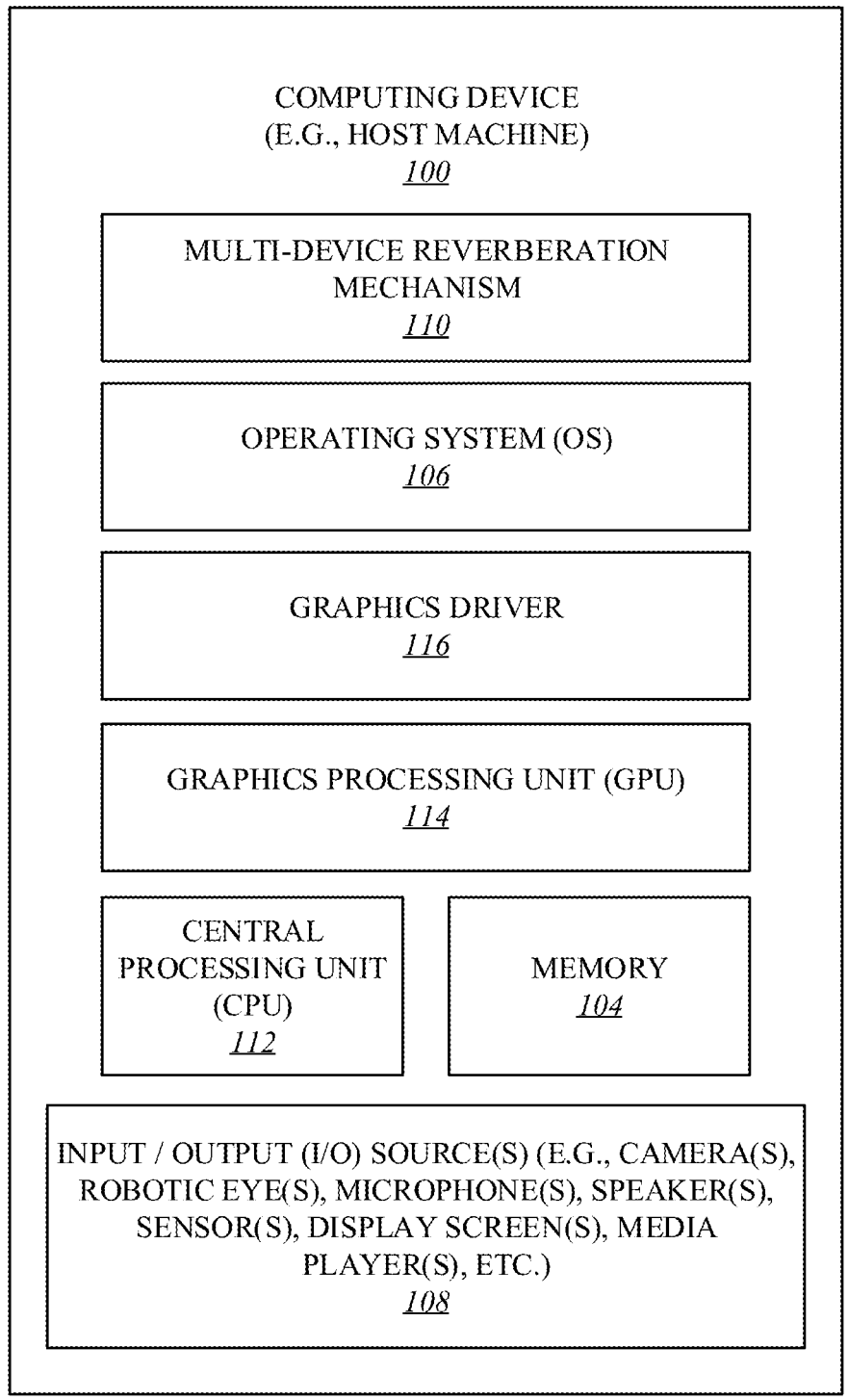
FIG. 1 illustrates a computing device employing a multi-device reverberation estimation mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique to postulate using speech to reverberation modulation energy ratio (SRMR) measurements to obtain precise estimates of reverberation time (RT) measurements (or simply "RT"). In one embodiment, any relationship between SRMR and RT is discovered and utilized for a specific utterance. Further, due to the variability of the SRMR, the SRMR measurement may be performed using known commands (e.g., wake words, key-phrases, etc.), while due to the constraints associated with RT measurements, the SRMR measurement may be done in a multi-device setup.

Embodiments provide for better adaption to acoustical environment by utilizing additional knowledge, while allowing for tuning of some post-processing algorithms based on the estimated RT for better speech intelligibility, music playback quality, better user experience in smart speaker domain, and/or the like. Embodiments further provide for tuning of pre-processing algorithms based on estimated RT for better key-phrase recognition and automatic speech recognition.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a multi-device reverberation estimation mechanism ("reverberation estimation mechanism") 110 according to one embodiment. In one embodiment, computing device 100 represents a server computing device ("server computer" or "server device") in communication with other computing devices, such as computing devices A 260, B 270, Nth 280 (e.g., voice-enabled devices) of FIG. 2, over one or more communication medium(s) 230 of FIG. 2, such as a cloud network, a proximity network, the Internet, etc. In another embodiment, computing device 100 may itself be another voice-enabled device. For the sake of brevity, clarity, and ease of understanding, computing device 100 may be referred to as "server/voice-enabled device" throughout the rest of this document to suggest that computing device 100 may be a server computer or a voice-enabled device or a combination thereof.

Figure 2:
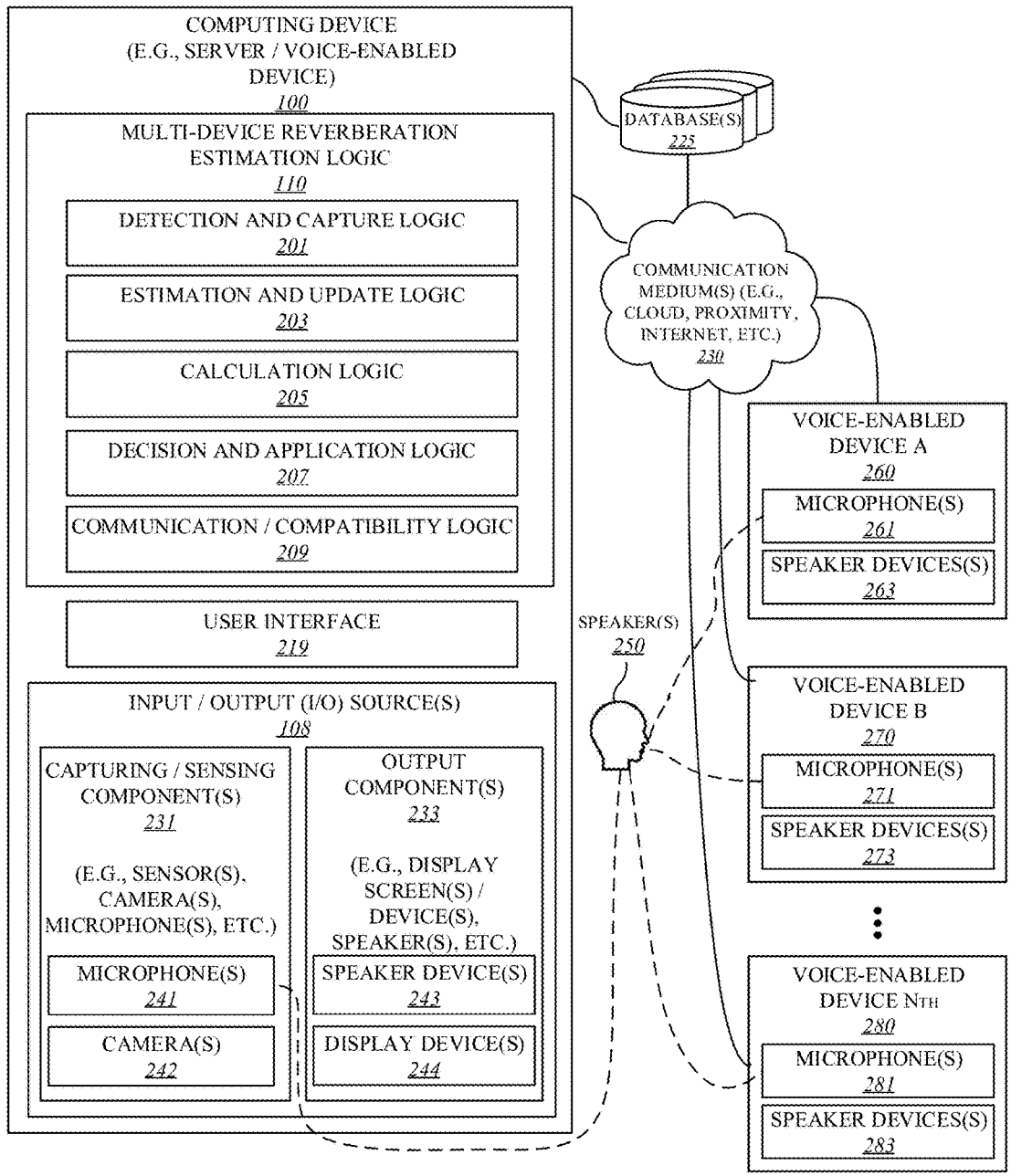
FIG. 2 illustrates the multi-device reverberation estimation mechanism of FIG. 1 according to one embodiment.

Server/voice-enabled device 100 as well as voice-enabled devices 260, 270, 280 of FIG. 2 represent communication and data processing devices including or representing (without limitations) voice-enabled devices (VEDs), a voice command devices (VCDs), and/or the like. Throughout this document, terms like "smart voice devices", "smart voice-enabled devices", "voice-enabled devices", and "voice devices" may be interchangeably referenced. Server/voice-enabled device 100 and voice-enabled devices 260, 270, 280 of FIG. 2 may include or work with or is embedded in or facilitates any number and type of smart devices, such as (without limitation) smart command devices or intelligent personal assistants (e.g., Echo® by Amazon.com®, etc.), home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, server/voice-enabled device 100 and voice-enabled devices 260, 270, 280 of FIG. 2 may include or work with or are embedded in or facilitate any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, server/voice-enabled device 100 and voice-enabled devices 260, 270, 280 of FIG. 2 may each include a computer platform hosting an integrated circuit ("IC"), such as a system on a chip ("SoC" or "SOC"), integrating various hardware and/or software components of each of server/voice-enabled device 100 and voice-enabled devices 260, 270, 280 of FIG. 2 on a single chip.

As illustrated, in one embodiment, server/voice-enabled device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Server/voice-enabled device 100 may further include operating system (OS) 106 serving as an interface between hardware and/or physical resources of server/voice-enabled device 100 and its users.

It is to be appreciated that a lesser or more equipped system than the example described above may be preferred for certain implementations. Therefore, for example, the configuration of server/voice-enabled device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, reverberation estimation mechanism 110 may be hosted by operating system 106 in communication with I/O source(s) 104, such as microphone(s), of voice-enabled device 100. In another embodiment, reverberation estimation mechanism 110 may be hosted or facilitated by graphics driver 116. In yet another embodiment, reverberation estimation mechanism 110 may be hosted by or part of graphics processing unit ("GPU" or simply graphics processor") 114 or firmware of graphics processor 114. For example, reverberation estimation mechanism 110 may be embedded in or implemented as part of the processing hardware of graphics processor 114. Similarly, in yet another embodiment, reverberation estimation mechanism 110 may be hosted by or part of central processing unit ("CPU" or simply "application processor") 112. For example, reverberation estimation mechanism 110 may be embedded in or implemented as part of the processing hardware of application processor 112.

In yet another embodiment, reverberation estimation mechanism 110 may be hosted by or part of any number and type of components of server/voice-enabled device 100, such as a portion of reverberation estimation mechanism 110 may be hosted by or part of operating system 116, another portion may be hosted by or part of graphics processor 114, another portion may be hosted by or part of application processor 112, while one or more portions of reverberation estimation mechanism 110 may be hosted by or part of operating system 116 and/or any number and type of devices of server/voice-enabled device 100. It is contemplated that embodiments are not limited to any implementation or hosting of reverberation estimation mechanism 110 and that one or more portions or components of reverberation estimation mechanism 110 may be employed or implemented as hardware, software, or any combination thereof, such as firmware.

Server/voice-enabled device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

FIG. 2 illustrates multi-device reverberation estimation mechanism 110 of FIG. 1 according to one embodiment. For brevity, many of the details already discussed with reference to FIG. 1 are not repeated or discussed hereafter. In one embodiment, reverberation estimation mechanism 110 may include any number and type of components, such as (without limitations): detection and capture logic 201; estimation and update logic 203; calculation logic 205; decision and application logic 207; and communication/compatibility logic 209.

Server/voice-enabled device 100 is further shown to include user interface 219 (e.g., graphical user interface (GUI)-based user interface, Web browser, cloud-based platform user interface, software application-based user interface, other user or application programming interfaces (APIs), etc.). As with server/voice-enabled device 100, voice-enabled devices A 260, B 270, Nth 280 may also include one or more user interfaces, where voice-enabled device Nth 280 may also be referred to as "Nth voice-enabled device". Server/voice-enabled device 100 may also include I/O source(s) 108 having capturing/sensing component(s) 231, such as camera(s) 242 (e.g., Intel® RealSense™ camera), sensors, microphone(s) 241, etc., and output component(s) 233, such as display(s) (e.g., integral displays, tensor displays, projection screens, display screens, etc.), speaker devices(s) or simply speaker(s) 243, etc.

As discussed with reference to FIG. 1, voice-enabled devices 260, 270, 280 may host the same or similar hardware and/or software components as server/voice-enabled device 100, such as voice-enabled devices 260, 270, and 280 may include microprocessor(s) 261, 271, and 281, respectively, and speaker device(s) 263, 273, and 283, respectively, along with other I/O components in addition to graphics processors, application processors, memory, and/or the like.

Server/voice-enabled device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, server/voice-enabled device 100 may host I/O sources 108 including capturing/sensing component(s) 231 and output component(s) 233. In one embodiment, capturing/sensing component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display devices or screens, projectors, speakers, light-emitting diodes (LEDs), speaker(s) 243, and/or vibration motors, etc.

For example, as illustrated, capturing/sensing component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into server/voice-enabled device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into server/voice-enabled device 100.

It is contemplated that embodiments are not limited to any number or type of microphone(s) 241, camera(s) 243, speaker(s) 243, etc. For example, as facilitated by detection and capture logic 201, one or more of microphone(s) 241 may be used to detect speech or sound simultaneously from multiple users or speakers, such as speaker 250. Similarly, as facilitated by detection and capture logic 201, one or more of camera(s) 242 may be used to capture images or videos of a geographic location (such as a room) and its contents (e.g., furniture, electronic devices, humans, animals, plats, etc.) and form a set of images or a video stream form the captured data for further processing by reverberation estimation mechanism 110 at server/voice-enabled device 100.

Similarly, as illustrated, output component(s) 233 may include any number and type of speaker device(s) or speaker(s) 243 to serve as output devices for outputting or giving out audio from server/voice-enabled device 100 for any number or type of reasons, such as human hearing or consumption. For example, speaker(s) 243 work the opposite of microphone(s) 241 where speaker(s) 243 convert electric signals into sound.

To avoid any potential confusion of terms, it is contemplated and to be noted that "speaker(s)" 250 refers to users or individuals or humans who speak into voice-enabled device 100 using their voices or sounds, while "speakers" or "speaker device(s)" 243 are part of output component(s) 233 and refer to one or more output devices coupled to or embedded into server/voice-enabled device 100 to convert electric signals into sound.

It is contemplated that automatic speech recognition (ASR) performance varies depending on acoustical environments in which ASR-enabled (voice-enabled) devices 100, 260, 270, 280 operate. The unpredictable nature of RT often turns into a key factor contributing to the variability of such devices 100, 260, 270, 280, especially in clean condition when there are no noise sources. Although there are conventional techniques to blindly reduce RT or to tune ASR engines for various RTs, but as described above, such conventional techniques are not applicable to or workable with certain scenarios along with being intrusive.

Embodiments provide for an optimal solution to know or compute the precise RT of the environment in which ASR-enabled (voice-enabled) devices 100, 260, 270, 280 operate. In one embodiment, known RT values may be used to either increase the de-reverberation performance or select RT-specific ASR tuning profiles in an ASR engine as facilitated by reverberation estimation mechanism 110.

Embodiments further provide for better adaption to acoustical environment by utilizing additional knowledge, while allowing for tuning of some post-processing algorithms based on the estimated RT for better speech intelligibility, music playback quality, better user experience in smart speaker domain, and/or the like. Embodiments further provide for tuning of pre-processing algorithms based on estimated RT for better recognition of key-phrases, wake words, speech recognition, etc.

For example, nowadays, it is a common situation to have a user with multiple devices, such as voice-enabled devices 260, 270, 280, in a single geographical space, such as a room, where these multiple devices 260, 270, 280 are equipped with far-field speech capabilities, such as smart speaker(s) 243, 263, 273, 283, laptop computers, smart fridges, home/office security systems, washers/dryers, smart locks, etc. Such a multi-device setup, as further illustrated with respect to FIGS. 3A-3B, allows performance of distributed far-field speech processing. Stated different, having multiple devices, such as voice-enabled devices 260, 270, 290, in one room may allow for sharing of data and/or signal between each other over communication medium(s) 230, such as a proximity network like the Bluetooth.

As aforementioned, conventional techniques involve omnidirectional loudspeakers and microphones, where both the loudspeakers and microphones are required to be separated by a considerable distance, such as greater than a meter.

It is contemplated that loudspeakers are known to generate artificially generated signals (e.g., sounds, noises, tones), while microphones capture responses. Since measurements are repeated at multiple microphone-loudspeaker positions, an average of them across all positions may be considered a representative RT value for the room. Since conventional techniques are regarded as intrusive, embodiments provide for using natural acoustical signals, such as speech, for estimating speech to reverberation modulation energy ratio (SRMR) as facilitated by estimation and update logic 203.

In one embodiment, speech (e.g., sounds, noises, tunes, etc.) may be uttered or emitted by speaker(s) 250 (e.g., humans, animals, devices, tools, vehicles, nature, etc.) and captured by one or more microphones 241 as facilitated by detection and capture logic 201. For example, in this case, the speech may be a command (such as what day is it today, show me the route to the nearest coffee shop, etc.) uttered by speaker(s) 250, such as a user, into one or more voice-enabled devices 260, 270, 280. Once this speech has been captured, in one embodiment, calculation logic 203 (which may be hosted by any one or more of devices 100, 260, 270, 280) is triggered to evaluate the speech and estimate the SRMR associated with the captured speech.

Figure 3A:
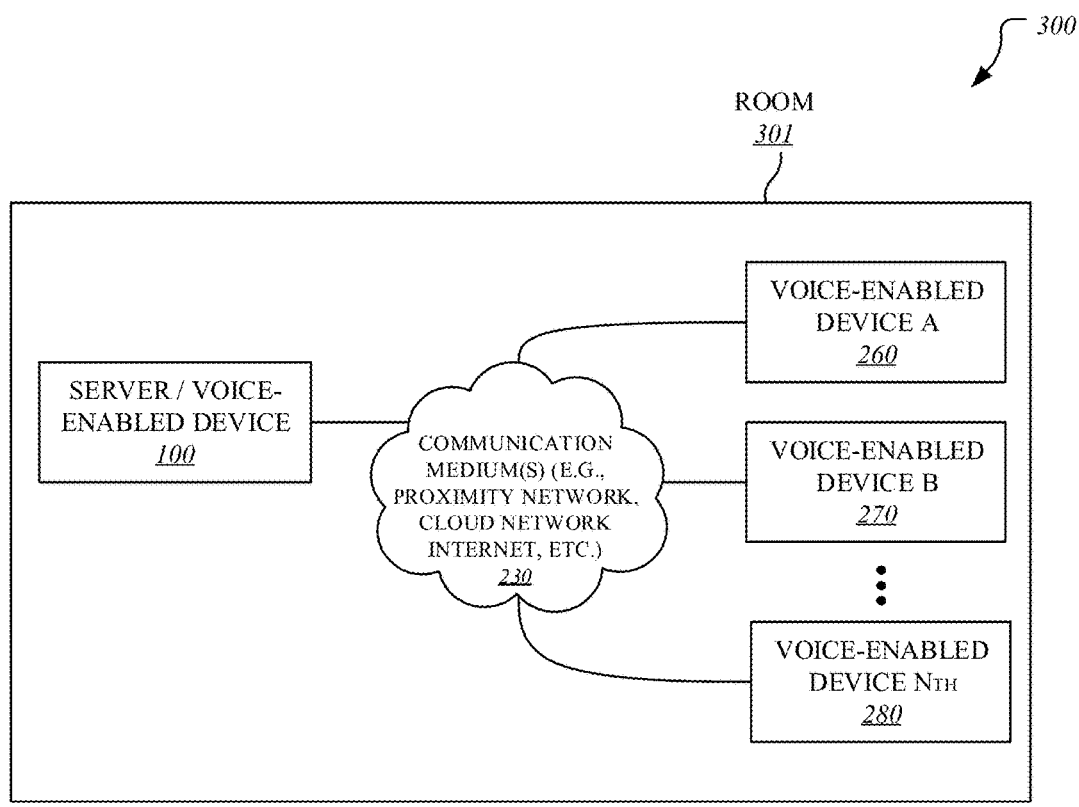
FIGS. 3A-3B illustrate multi-device setups for reliable reverberation time (RT) estimations according to one embodiment.
Figure 3B:
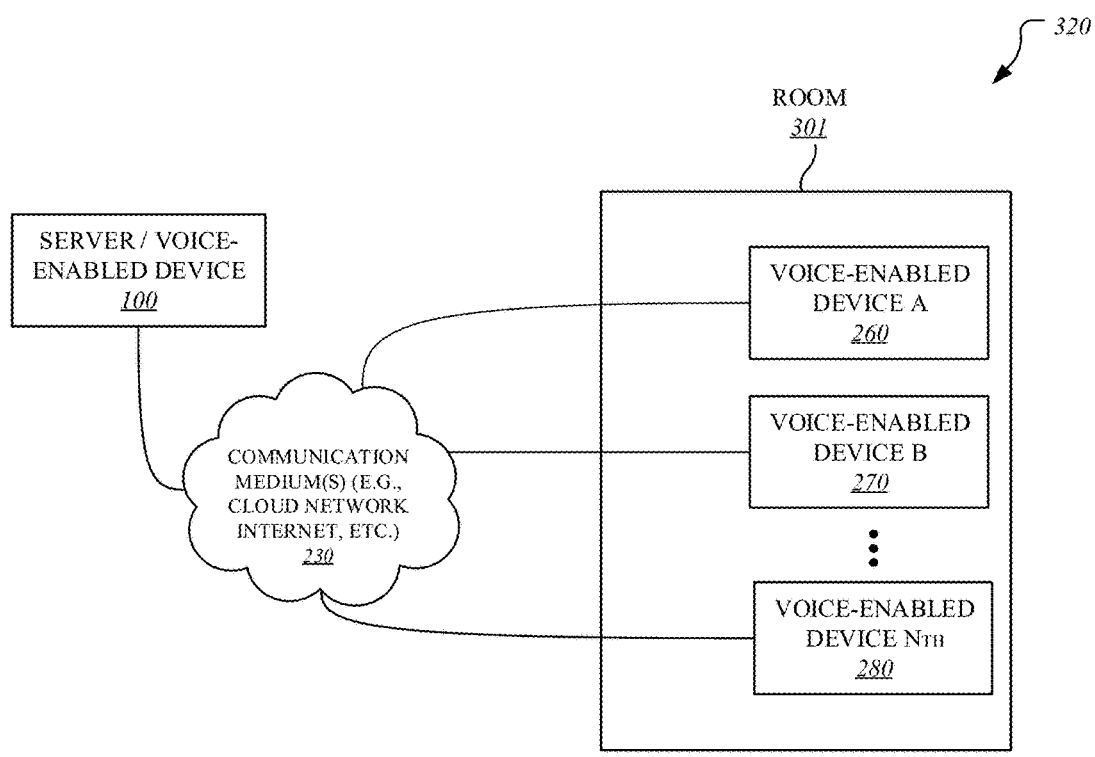
Figure 3C:
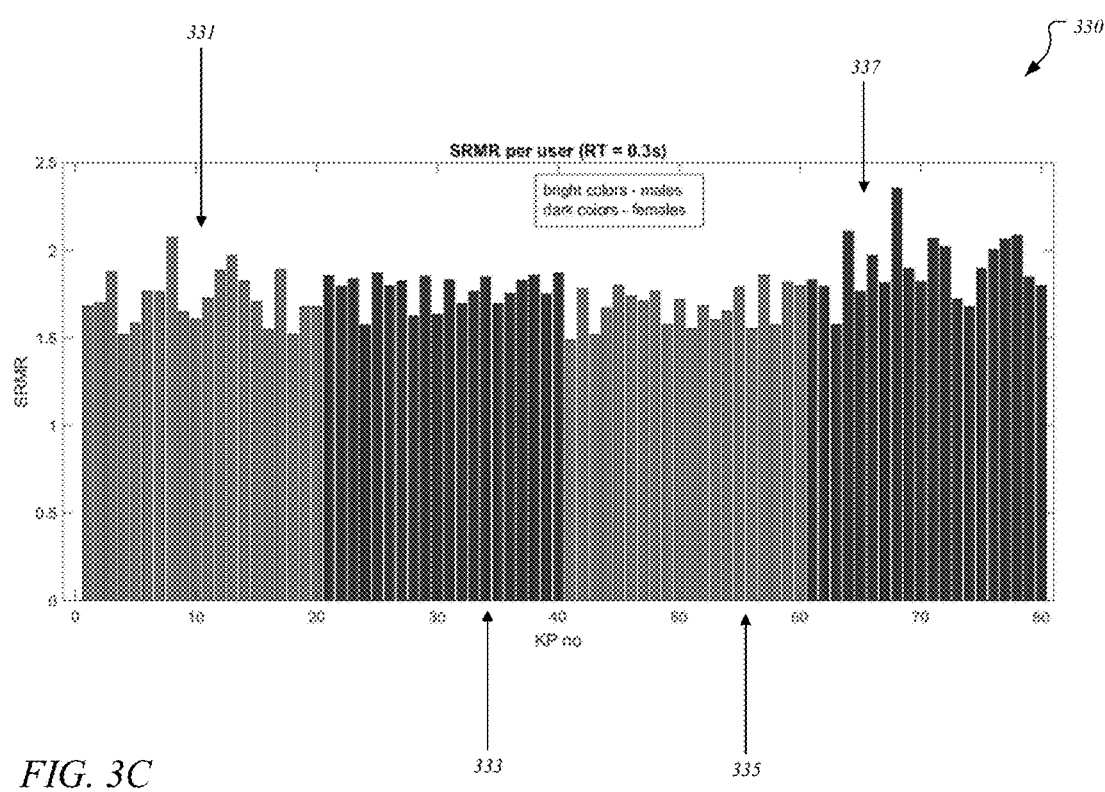
FIGS. 3C-3D illustrate graphs showing variations in speech to reverberation modulation energy ratio (SRMR) values according to one embodiment.
Figure 3D:
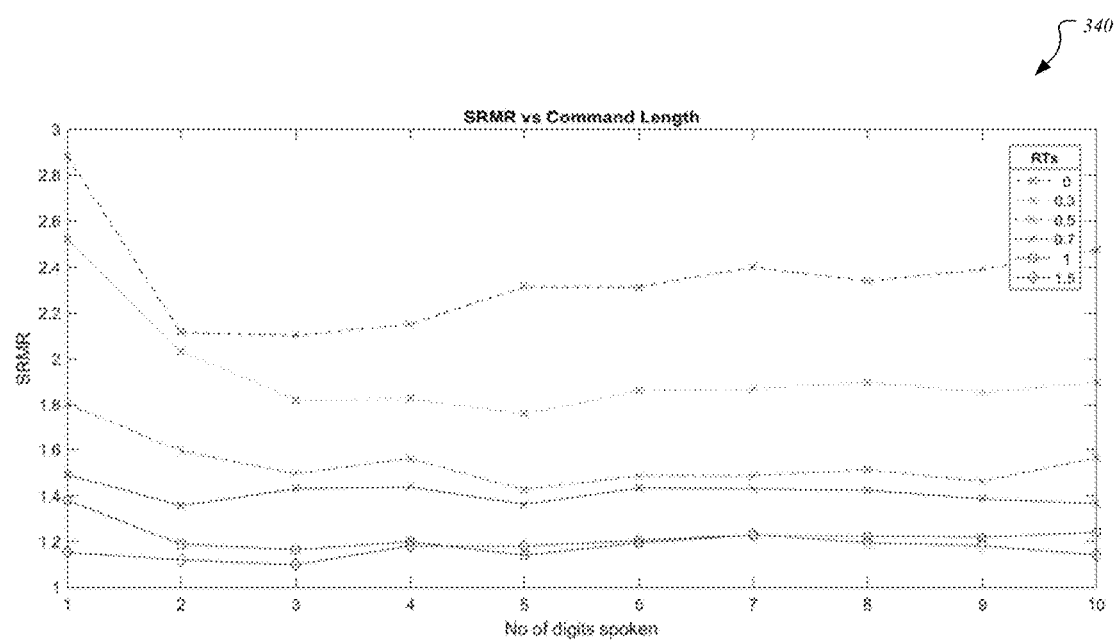
Figure 3E:
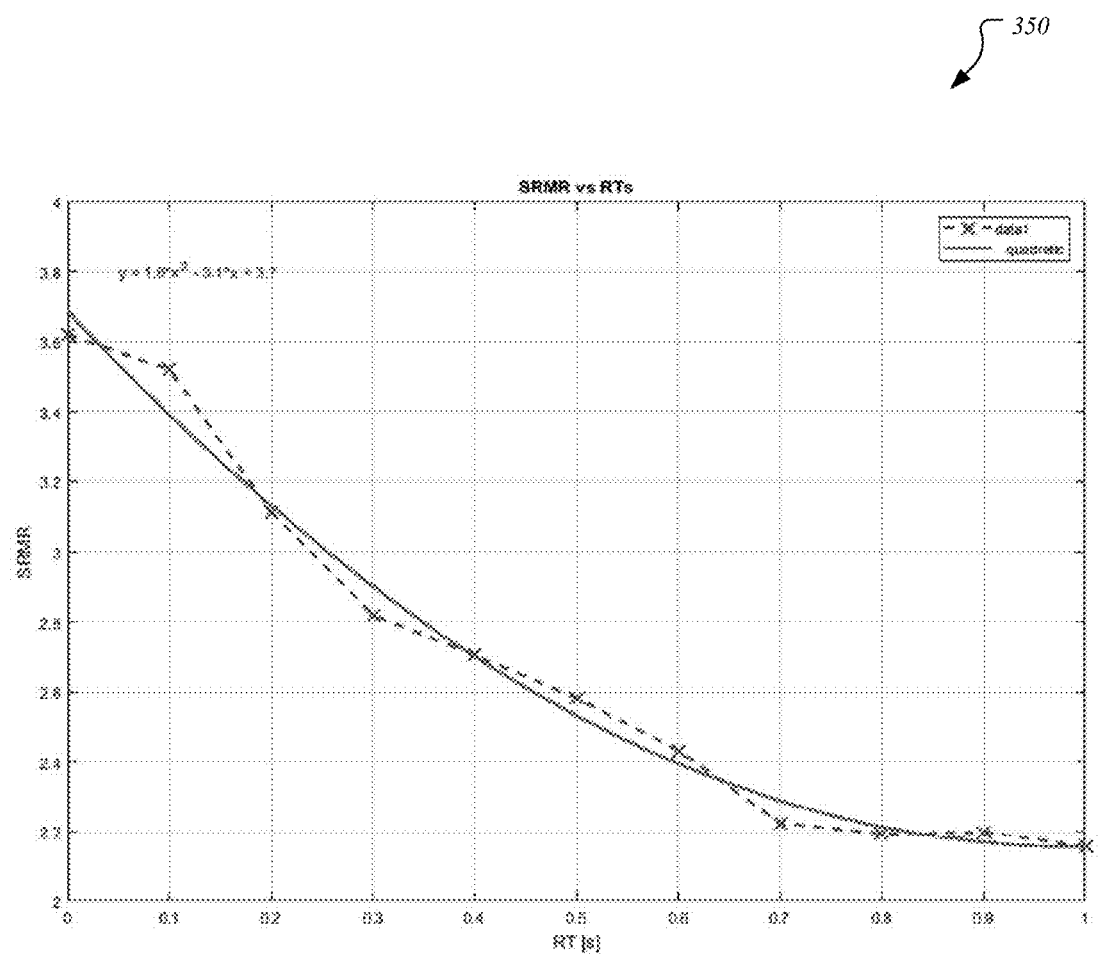
FIG. 3E illustrates a graph showing a relationship between SRMR values and RTs according to one embodiment.

It is contemplated that despite the variability of the SRMR for a selected command spoken multiple times by a specific speaker(s) 250 (such as through text-to-speech engine), the ongoing relation between SRMR and RT may remain fixed for one specific repetition as shown in the graph with respect to FIG. 3E. This fixed or constant relationship is a novel observation, which shows that for a specific command utter once per specific speaker(s) 250, the SRMR and RT remain constant in their relationship with each other.

Now, as further illustrated with reference to FIG. 4A, a speaker, such as one of speaker(s) 250 of FIG. 2, issues a command (e.g., key-phrase, wake word, etc.) to voice-enabled device 260, which is then also captured by voice-enabled devices 260, 270, 280 through their microphones 261, 271, 281, respectively. It is contemplated and to be noted that in some embodiment, one or more of voice-enabled devices 260, 270, 280 may be started manually through a setup sequence, such as by pressing a start/power button, or other setup techniques using remote devices, such as a remote control, a computing device, a smartphone, a smart wearable device, and/or the like. In one embodiment, server/voice-enabled device 100 may be a local voice-enabled device in the room with other devices 260, 270, 280; however, in this illustrated embodiment of FIG. 4A, server/voice-enabled device 100 may serve as a server computer hosting reverberation estimation logic 110 over communication medium(s) 230, such as a cloud network. In one embodiment, SRMR may be calculated by calculation logic 203 not just at server/voice-enabled device 100 (particularly, when serving as another voice-enabled device), but also or alternatively at voice-enabled devices 270, 280. As a result, using the SRMR estimations, one or more SRMR tables are then updated by update logic 205.

Further, in one embodiment, decision and application logic 207 may be triggered to decide as to which of voice-enabled device 260, 270, 280 to hand the command uttered by speaker(s) 250 in responding to the command and providing what is requested by the command. For example, as illustrated with respect to FIG. 4A, voice-enabled device 270 may be chosen by decision and application logic 207 to apply its resources and respond to the command. As a result, voice-enabled device 270 a response to the command may be generated by voice-generated device 270 or by server/voice-enabled device 100 and transmitted over to voice-enabled device 270 such that voice-enabled device 270 may issue the response to speaker(s) 250 through its speaker device(s) 273, where this response is also captured by voice-enabled devices 260, 280 through their respective microphones 261, 281.

Upon issuing of the response by voice-enabled device 270, additional SRMR calculations are performed at voice-enabled devices 260, 280 as facilitated by calculation logic 203 and these SRMR calculations may also be performed at or at least communicated on to server/voice-enabled device 100. In one embodiment, at server/voice-enabled device 100, update logic 205 is yet again triggered to capture the new SRMR calculations by updating the one or more SRMR tables stored and maintained at database(s) 225.

In one embodiment, decision and application logic 207 may yet again be triggered to decide to select another device, such as voice-enabled device 280, to generate a response and this response may again lead to capturing of the response by other voice-enabled devices 260, 270 as facilitated by detection and capture logic 201 and calculation of new SRMR values by voice-enabled devices 260-270 as facilitated by calculation logic 203. This one or more SRMR tables are then updated with the new SRMR calculations by server/voice-enabled device 100 as facilitated by update logic 205.

This sequence of processes may continue in this manner until a response to the command is offered by each of voice-enabled devices 260, 270, 280. For example, server/voice-enabled device 100 serving as a centralized device may continue to initiate next or following rounds of responses and SRMR calculations until all voice-enable devices 260, 270, 280 have responded and by the end of each sequence, server/voice-enabled device 100 may have an extensive set of SRMR coming from pairs of voice-enabled devices 260, 270, 280, such as:

SRMRs={$SRMR_{12}$, $SRMR_{1N}$, $SRMR_{21}$, $SRMR_{2N}$, ..., $SRMR_{N1}$, $SRMR_{N2}$, ... }

In one embodiment, based on this set of SRMRs, calculation logic 203 may then be used to estimate reliable RT as a median or a mean. Once estimate, decision and application logic 207 may then be triggered to apply this estimated or known RT to improve the overall recognition of ASR, wake words, key-phrases, and/or the like, in this multi-device setup. For example, knowing RT may allow for efficient dereverberation of speech signal, where dereverberation essentially nullifies or removes reverberation (e.g., echoes, noise, resonance, etc.) or, in other words, diminishes any negative environmental effects of sound reflections to produce better, natural, and reverberation-free sounds.

It is contemplated that reverberation refers to prolonged sounds or resonances having continuing effects or repercussions in an acoustical environment. In other words, reverberation refers to the persistence of sound after a sound has been produced. This reverberation can have a large reflection built up that is then followed by gradual decay with time as the reflective sounds is absorbed by objects and/or surfaces of the space.

It is further contemplated that RT may depend on the size of the space (also referred to as "room") along with its shape, interior materials of objects and surfaces, etc. For example, reverberation time may be estimated using merely the size of the space based on certain assumptions, such as typical shapes of the space (e.g., square office room, rectangle living room, etc.), standard interior objects (e.g., wooden furniture, paper books, etc.), expected surfaces (e.g., gypsum walls, carpeted bedroom floor, tiled bathroom floor, etc.), and/or the like.

Capturing/sensing component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as server/voice-enabled device 100 and voice-enabled devices 260, 270, 280, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as server/voice-enabled device 100. In another example, "logic" may refer to or include a hardware component that is capable of being physically installed along with or as part of one or more system hardware elements, such as an application processor, a graphics processor, etc., of a computing device, such as server/voice-enabled device 100. In yet another embodiment, "logic" may refer to or include a firmware component that is capable of being part of system firmware, such as firmware of an application processor or a graphics processor, etc., of a computing device, such as server/voice-enabled device 100.

Further, any use of a particular brand, word, term, phrase, name, and/or acronym, such as "voice device", "voice-enabled device", "server/voice-enabled device", "reverberation", "dereverberation", "RT", "speech to reverberation modulation energy ratio", "SRMR", "reverberation time or RT estimation", "space", "room", "far-field processing", "far-field audio system", "multi-device environment", "RealSense™ camera", "real-time", "automatic", "dynamic", "user interface", "camera", "sensor", "microphone", "display screen", "speaker device", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from reverberation estimation mechanism 110 to facilitate various embodiments including adding, removing, and/or enhancing certain features. For brevity, clarity, and ease of understanding of reverberation estimation mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

FIGS. 3A-3B illustrate multi-device setups 300, 320 for reliable RT estimations according to one embodiment. For brevity, many of the details previously discussed with reference to FIGS. 1-2 may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reverberation estimation mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As discussed with reference to FIG. 2 and illustrated here with reference to FIG. 3A, in multi-device setup 300, all devices including server/voice-enabled device 100 as well as voice-enabled devices A 360, B 370, and Nth 380 are shown as being in a single geographical space, such as room 301, in communication with each other over one or more communication medium(s) 230, such as a proximity network, Bluetooth, Internet, cloud network, etc.) As discussed earlier, in this case, server/voice-enabled device 100 may serve as a voice-enabled device, but also as a central voice-enabled device performing various duties of a server computer hosting reverberation estimation mechanism 110 of FIG. 2.

Now with reference to FIG. 3B, in multi-device setup 320 is shown as having certain voice-enabled devices A 260, B 270, Nth 280 inside room 301, but server/voice-enabled device 100 may be located remotely and in communication with voice-enabled devices 260, 270, 280 over one or more communication mediums 230, such as a cloud network, the Internet, etc. In this embodiment, server/voice-enabled device 100 may serve more like a server computer hosting reverberation estimation mechanism 110 of FIG. 2 for performing its centralized/server duties and less like a typical voice-enabled device.

In either of multi-device setups 300, 320, since the relation between RT and SRMR for any specific command is monotonic and can be approximated using mathematical formulae (e.g., quadric function) as facilitated by reverberation estimation mechanism 110 of FIG. 2 and thus RTs may be precisely estimated using SRMR values that are calculated from signals captured within multi-device setups 300, 320 as further illustrated with reference to FIG. 4A. It is contemplated and to be noted that these illustrations, such as multi-device setups 300, 320 are merely provided as examples for brevity, clarity, and ease of understanding and that embodiments are not limited as such.

FIGS. 3C-3D illustrate graphs 330, 340 showing variations in SRMR values according to one embodiment. For brevity, many of the details previously discussed with reference to FIGS. 1-3B may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reverberation estimation mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As illustrated with respect to FIG. 3C, graph 330 is obtained from and shows SRMR values for a command that is repeated about 20 times by four users. For example, as illustrated, section A 331 of graph 330 shows SRMR values for the command when repeated 20 times by user A and similarly, sections B 333, C 335, and D 337 of graph 330 show SRMR values for the command when repeated 20 times by users B, C, and D, respectively. As illustrated, the SRMR values may vary within the same phrase when spoken multiple times by the same user, such as between different bars in the same section, such as section A, where the variation between different users is even bigger, such as from section A 331 to section B 333, etc.

Similarly, graph 340 of FIG. 3D shows SRMR values for the same user speaking digits (such as from one-two, one-two-three, etc.) in different RTs. This graph 340 illustrates SRMR values varying with each command length (e.g., number of digits) that are spoken by the same user as shown by the varying horizontal lines of graph 340. The variation is different for different RTs.

As discussed earlier, conventional techniques are not capable of being implemented in multi-device setups, where, for example, a single voice-enabled device plays an excitation signal, while another voice-enabled device measures a response, where excitation signals are not human-friendly (e.g., loud noise, sweeps, chirps, etc.). Further, conventional techniques are intrusive.

Embodiments provide for a novel non-intrusive technique for estimating SRMR values and using them to calculate RT and applying dereverberation even when the SRMR values are inconsistent for speech commands coming from different users or even the same user as illustrated in FIGS. 3B-3C. Although SRMR values may be inconsistent with regards to commands or users, they are found in a fixed relationship with RTs as illustrated in FIG. 3E.

FIG. 3E illustrates a graph 350 showing a relationship between SRMR values and RTs according to one embodiment. For brevity, many of the details previously discussed with reference to FIGS. 1-3D may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reverberation estimation mechanism 110 of FIG. 1.

As aforementioned, despite the variability of SRMRs, such as in case of a selected command spoken once by a specific user, the relation between SRMRs and RTs is fixed as shown in graph 350. This is a novel observation that is applied in using reverberation estimation mechanism 110 of FIG. 2.

For example, if a set of text-to-speech (TTS)-generated commands are placed and observed, any relevant data accrued for any one of those commands, when dissected, would show a similar relationship between SRMRs and RTs for that command as illustrated in graph 350 of FIG. 3E. For example, each command may be convolved with impulse responses (IRs) in rooms with different RTs, where the rooms' RTs may vary from anechoic to 1 second long as reflected on the x-axis of graph 350, where the rooms may vary in sizes (such as small to big) and in sound reflection coefficients (such as from dead to alive). As shown in graph 350 of FIG. 3E, the relation between SRMRs and RTs for a specific command may be monotonic and approximated using mathematical formulae, such as using a quadric function leading to the solid curve on graph 350 and a corresponding equation.

Figure 4A:
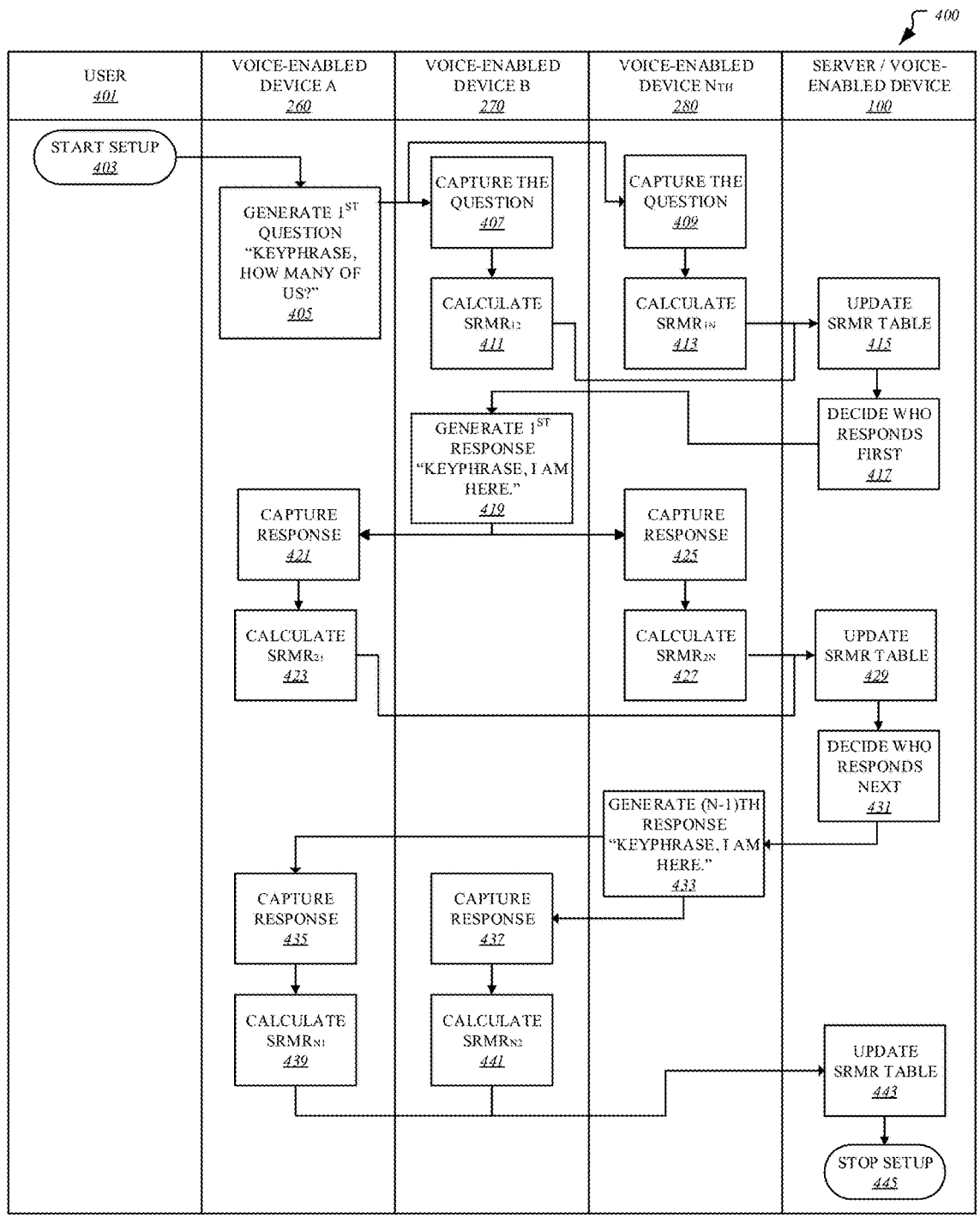
FIG. 4A illustrates a transaction sequence for reliable reverberation estimation for improved automatic speech recognition (ASR) in multi-device setups according to one embodiment.

FIG. 4A illustrates a transaction sequence 400 for reliable reverberation estimation for improved ASR in multi-device setups according to one embodiment. For brevity, many of the details previously discussed with reference to FIGS. 1-3E may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reverberation estimation mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

As illustrated, in one embodiment, transaction sequence 400 begins with user 401 starting the transaction sequence setup 403 by placing a command (e.g., question, wake word, key-phrase, etc.) with a microphone of voice-enabled device 260 or through other startup sequences, such as by pressing a start or power button or through one or more remove devices, such as remote controls, remove computing devices, mobile devices, etc. In turn, at 405, voice-enabled device 260 generates a TTS command of the command spoken by user 401, where the SRMR-to-RT profile of the spoken and TTS commands is known. At 407 and 409, the command is captured by microphones of voice-enabled devices 270 and 280, respectively, present in the same room with voice-enabled device 260 and subsequently, at 411 and 413, SRMR values are calculated at voice-enabled devices 270 and 280, respectively. It is contemplated that in some embodiments, SRMR may also be calculated at server/voice-enabled device 100. These calculated SRMR values are then forwarded on to server/voice-enabled device 100 over a network (e.g., cloud network, Internet), where server/voice-enabled device 100 may be serve as a centralized unit and may be local (even in the same room) with other voice-enable devices 260, 270, 280 or remote located elsewhere.

In one embodiment, at 415, this server/voice-enabled device 100 may then update one or more SRMR tables with the newly received SRMR values and then decide, at 417, which voice-enabled device is going to respond first based on the new SRMR values or other information, which may be selected or performed randomly. In the illustrated embodiment, voice-enabled device 270 is chosen to respond first at 419, where this response may be another TTS command with known SRMR-to-RT profile. Upon broadcasting response, at 421 and 425, the broadcasted response is captured by voice-enabled devices 260 and 280 and subsequently, at 423 and 427, based on the captured response, new SRMR values are calculated by voice-enabled devices 260 and 280, respectively, and send these SRMR values to server/voice-enabled device 100 for further processing.

At 429, yet again, server/voice-enabled device 100 updates the one or more SRMR tables based on the newly received SRMR values and decides on or chooses voice-enabled device 280 for response at 431. At 433, voice-enabled device 280 responds and as before, the other voice-enabled devices 260 and 270 capture the response at 435 and 437, respectively, followed by calculation of SRMR values at 439 and 441, respectively. Transaction sequence 400 continues with updating of the one or more SRMR tables at 443 using the newly received SRMR values, followed by termination of the setup at 445.

In one embodiment, each voice-enabled device 260, 270, 280 that captures a response, then calculates SRMR values and sends them to the centralized unit, such as server/voice-enabled device 100 for further processing, such as initiating next rounds of responses and SRMR calculations until all voice-enabled devices 260, 270, 280 have responded to the original command. As described above, at the end of transaction sequence 400, server/voice-enabled device 100 may have a full set of SRMR values coming from pairs of voice-enabled devices 260, 270, 280, such as:

SRMRs={$SRMR_{12}$, $SRMR_{1N}$, $SRMR_{21}$, $SRMR_{2N}$, . . . , $SRMRT_{N1}$, $SRMR_{N2}$, . . . }

In one embodiment, based on this set of SRMR values, RTs may be estimated and in knowing the RTs, dereverberation may be applied to the reverberation. It is contemplated that changing environments or setups, such as if the number of voice-enabled devices is high in the room, then the room's reverberation map may be computed to illustrate the RTs for specific device positions, where the map may be interpolated for other positions as well.

Figure 4B:
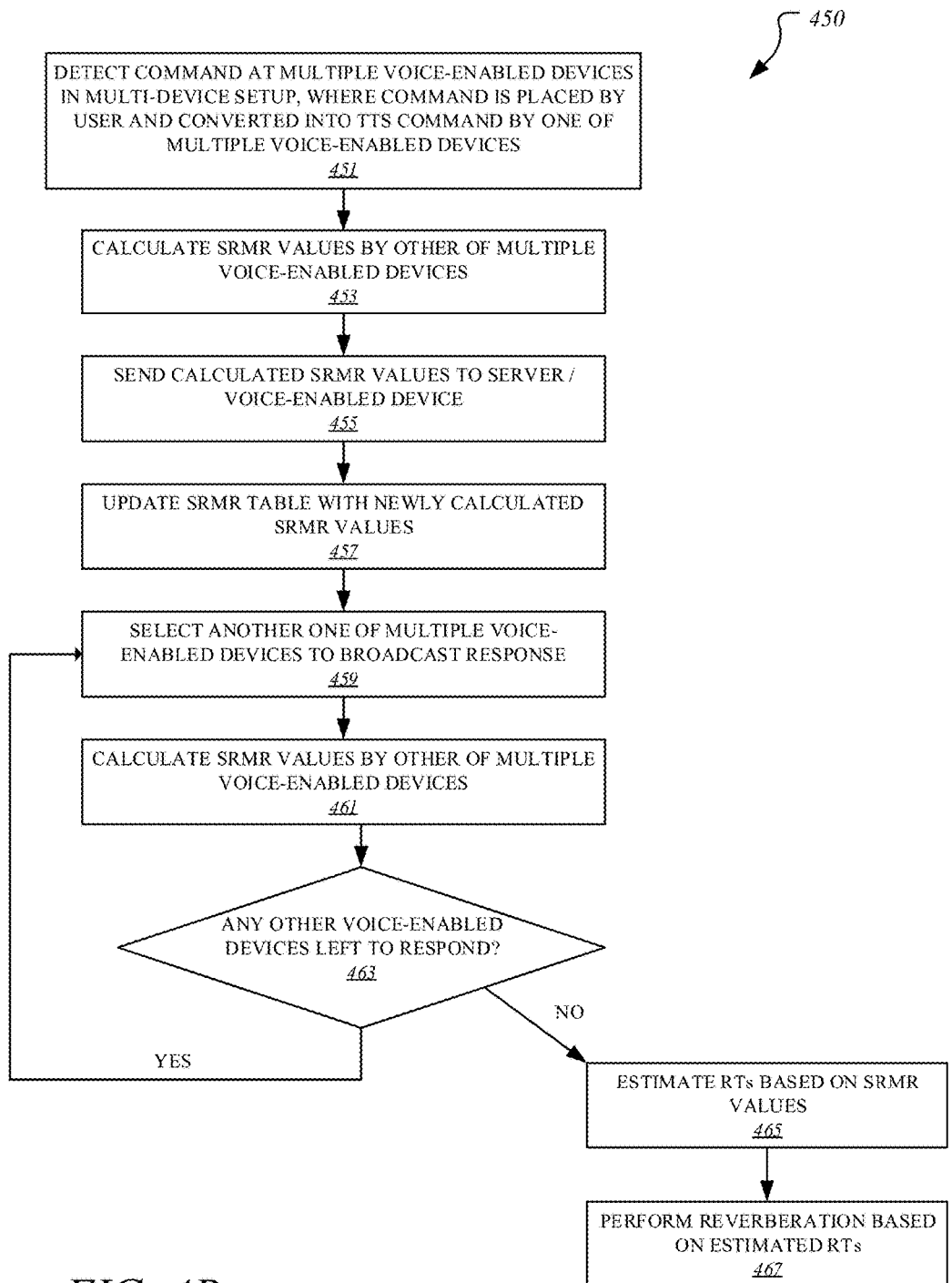
FIG. 4B illustrates a method for reliable reverberation estimation for improved ASR in multi-device setups according to one embodiment.

FIG. 4B illustrates a method 450 for reliable reverberation estimation for improved ASR in multi-device setups according to one embodiment. For brevity, many of the details previously discussed with reference to FIGS. 1-4A may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by reverberation estimation mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 450 begins at block 451 with detection of a command at multiple voice-enabled devices in a multi-device setup, where the command is placed by a user and converted into a TTS command by one of multiple voice-enabled devices. At block 453, SRMR values are calculated by other voice-enabled devices of the multiple voice-enabled devices. At block 455, calculated SRMR values are forwarded on to a server/voice-enabled device serving as a centralized unit amongst the multiple voice-enabled devices. At block 457, one or more SRMR tables are updated using the newly received SRMR values.

At block 459, the server/voice-enabled device selects one of the multiple voice-enabled devices to broadcast a response to the command, while at block 461, other devices of the multiple voice-enabled devices calculated SRMR values and send them to the server/voice-enabled device. At block 463, a determination is made as to whether there is another voice-enabled device that needs to respond. If there is at least one more voice-enabled device left to respond, method 400 continues with the process of block 459. If not, at block 465, RTs are estimated by the server/voice-enabled device based on the SRMR values. At block 467, dereverberation is performed based on the estimated and known RTs.

Figure 5:
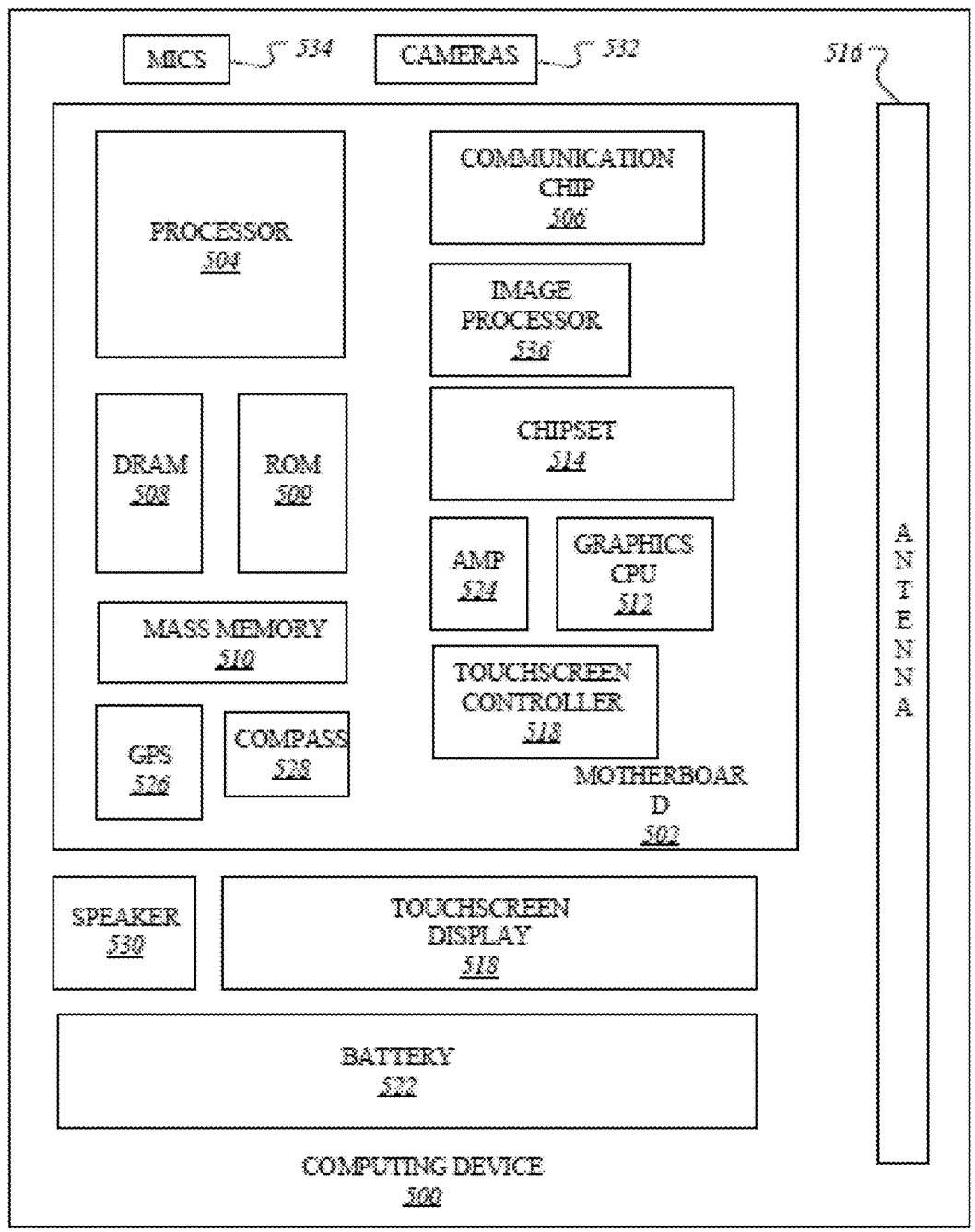
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understandings, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
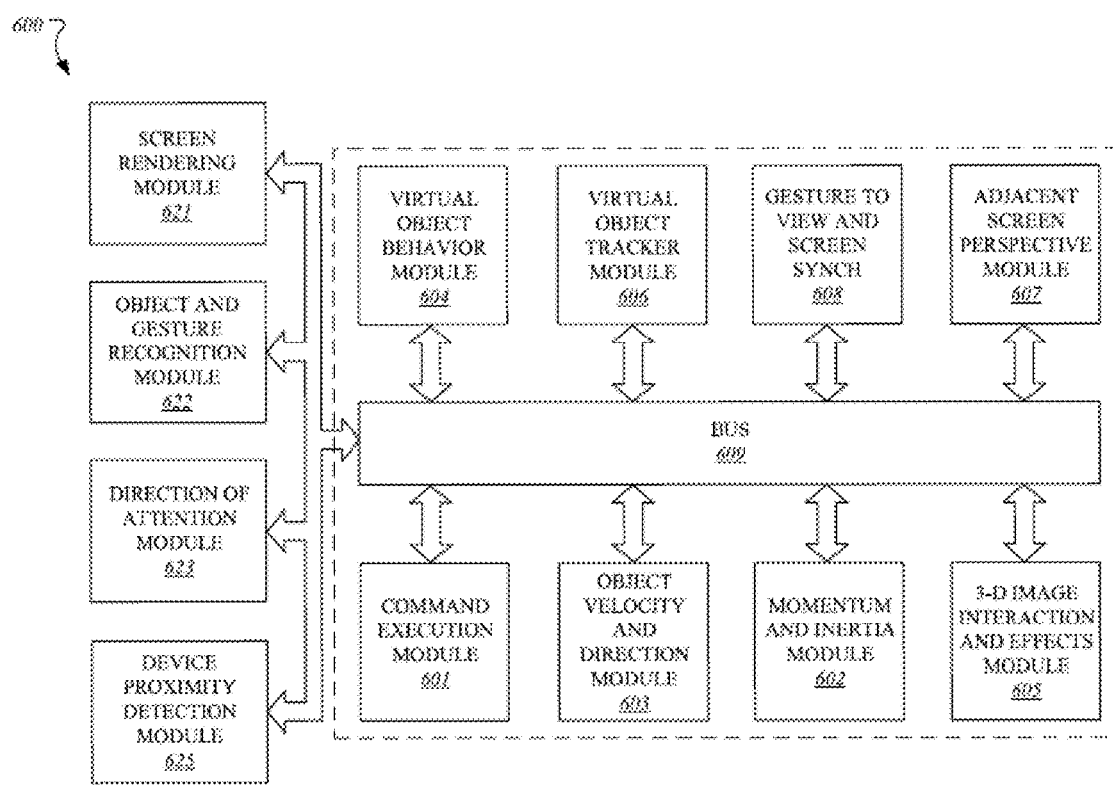
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate multi-device reverberation estimation, the apparatus comprising: detection and capture logic to facilitate a microphone of a first voice-enabled device of multiple voice-enabled devices to detect a command from a user; calculation logic to facilitate a second voice-enabled device and a third voice-enabled device to calculate speech to reverberation modulation energy ratio (SRMR) values based on the command, wherein the calculation logic us further to estimate reverberation times (RTs) based on the SRMR values; and decision and application logic to perform dereverberation based on the estimated RTs of the reverberations.

Example 2 includes the subject matter of Example 1, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

Example 3 includes the subject matter of Examples 1-2, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

Example 4 includes the subject matter of Examples 1-3, further comprising update logic to update one or more SRMR tables based on the calculated SRMR values.

Example 5 includes the subject matter of Examples 1-4, further comprising decision and application logic to select one of the second and third voice-enabled devices to issue a response to the command.

Example 6 includes the subject matter of Examples 1-5, wherein a relation between the SRMR values and the RTs is fixed, wherein the first, second, and third voice-enabled devices comprise one or more of smart speakers, laptop computers, mobile devices, smart wearable devices, smart household appliances, and smart locks.

Example 7 includes the subject matter of Examples 1-6, wherein each of the first, second, and third voice-enabled devices comprise one or more processors including a graphics processor co-located with an application processor on a common semiconductor package.

Some embodiments pertain to Example 8 that includes a method facilitating multi-device reverberation estimation, the method comprising: facilitating a microphone of a first voice-enabled device of multiple voice-enabled devices to detect a command from a user; facilitating a second voice-enabled device and a third voice-enabled device to calculate speech to reverberation modulation energy ratio (SRMR) values based on the command; estimating reverberation times (RTs) based on the SRMR values; and performing dereverberation based on the estimated RTs of the reverberations.

Example 9 includes the subject matter of Example 8, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

Example 10 includes the subject matter of Examples 8-9, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

Example 11 includes the subject matter of Examples 8-10, further comprising updating one or more SRMR tables based on the calculated SRMR values.

Example 12 includes the subject matter of Examples 8-11, further comprising selecting one of the second and third voice-enabled devices to issue a response to the command.

Example 13 includes the subject matter of Examples 8-12, wherein a relation between the SRMR values and the RTs is fixed, wherein the first, second, and third voice-enabled devices comprise one or more of smart speakers, laptop computers, mobile devices, smart wearable devices, smart household appliances, and smart locks.

Example 14 includes the subject matter of Examples 8-13, wherein each of the first, second, and third voice-enabled devices comprise one or more processors including a graphics processor co-located with an application processor on a common semiconductor package.

Some embodiments pertain to Example 15 that includes a data processing system comprising a computing system having a memory device coupled to a processing device, the processing device to: facilitate a microphone of a first voice-enabled device of multiple voice-enabled devices to detect a command from a user; facilitate a second voice-enabled device and a third voice-enabled device to calculate speech to reverberation modulation energy ratio (SRMR) values based on the command; estimate reverberation times (RTs) based on the SRMR values; and perform dereverberation based on the estimated RTs of the reverberations.

Example 16 includes the subject matter of Example 15, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

Example 17 includes the subject matter of Examples 15-16, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

Example 18 includes the subject matter of Examples 15-17, wherein the processing device is further to update one or more SRMR tables based on the calculated SRMR values.

Example 19 includes the subject matter of Examples 15-18, wherein the processing device is further to select one of the second and third voice-enabled devices to issue a response to the command.

Example 20 includes the subject matter of Examples 15-19, wherein a relation between the SRMR values and the RTs is fixed, wherein the first, second, and third voice-enabled devices comprise one or more of smart speakers, laptop computers, mobile devices, smart wearable devices, smart household appliances, and smart locks.

Example 21 includes the subject matter of Examples 15-20, wherein each of the first, second, and third voice-enabled devices comprise one or more processors including a graphics processor co-located with an application processor on a common semiconductor package.

Some embodiments pertain to Example 22 that includes an apparatus to facilitate multi-device reverberation estimation, the apparatus comprising: means for facilitating a microphone of a first voice-enabled device of multiple voice-enabled devices to detect a command from a user; means for facilitating a second voice-enabled device and a third voice-enabled device to calculate speech to reverberation modulation energy ratio (SRMR) values based on the command; means for estimating reverberation times (RTs) based on the SRMR values; and means for performing dereverberation based on the estimated RTs of the reverberations.

Example 23 includes the subject matter of Example 22, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

Example 24 includes the subject matter of Examples 22-23, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

Example 25 includes the subject matter of Examples 22-24, further comprising means for updating one or more SRMR tables based on the calculated SRMR values.

Example 26 includes the subject matter of Examples 22-25, further comprising means for selecting one of the second and third voice-enabled devices to issue a response to the command.

Example 27 includes the subject matter of Examples 22-26, wherein a relation between the SRMR values and the RTs is fixed, wherein the first, second, and third voice-enabled devices comprise one or more of smart speakers, laptop computers, mobile devices, smart wearable devices, smart household appliances, and smart locks.

Example 28 includes the subject matter of Examples 22-27, wherein each of the first, second, and third voice-enabled devices comprise one or more processors including a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
one or more processors to:
facilitate a microphone of a first voice-enabled device of multiple voice-enabled devices to detect a command from a user;
facilitate a second voice-enabled device and a third voice-enabled device in a multi-device environment to calculate speech to reverberation modulation energy ratio (SRMR) values based on the command;
estimate reverberation times (RTs) based on the SRMR values; and
perform dereverberation based on the estimated RTs of the reverberations, and recognize the command based on the estimated RTs.

2. The apparatus of claim 1, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

3. The apparatus of claim 1, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

4. The apparatus of claim 1, wherein the one or more processors are further to update one or more SRMR tables based on the calculated SRMR values.

5. The apparatus of claim 1, wherein the one or more processors are further to select one of the second and third voice-enabled devices to issue a response to the command.

6. The apparatus of claim 1, wherein a relation between the SRMR values and the RTs is fixed, wherein the first, second, and third voice-enabled devices comprise one or more of smart speakers, laptop computers, mobile devices, smart wearable devices, smart household appliances, and smart locks.

7. The apparatus of claim 1, wherein each of the first, second, and third voice-enabled devices comprise one or more processors including a graphics processor co-located with an application processor on a common semiconductor package.

8. A method comprising:
facilitating a microphone of a first voice-enabled device of multiple voice-enabled devices to detect a command from a user;
facilitating a second voice-enabled device and a third voice-enabled device in a multi-device environment to calculate speech to reverberation modulation energy ratio (SRMR) values based on the command;
estimating reverberation times (RTs) based on the SRMR values; and
performing dereverberation based on the estimated RTs of the reverberations, and recognize the command based on the estimated RTs.

9. The method of claim 8, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

10. The method of claim 8, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

11. The method of claim 8, further comprising updating one or more SRMR tables based on the calculated SRMR values.

12. The method of claim 8, further comprising selecting one of the second and third voice-enabled devices to issue a response to the command.

13. The method of claim 8, wherein a relation between the SRMR values and the RTs is fixed, wherein the first, second, and third voice-enabled devices comprise one or more of smart speakers, laptop computers, mobile devices, smart wearable devices, smart household appliances, and smart locks.

14. The method of claim 8, wherein each of the first, second, and third voice-enabled devices comprise one or more processors including a graphics processor co-located with an application processor on a common semiconductor package.

15. At least one non-transitory machine-readable medium comprising instructions which, when executed by a computing device, cause the computing device to perform operations comprising:
facilitating a microphone of a first voice-enabled device of multiple voice-enabled devices to detect a command from a user;
facilitating a second voice-enabled device and a third voice-enabled device in a multi-device environment to calculate speech to reverberation modulation energy ratio (SRMR) values based on the command;
estimating reverberation times (RTs) based on the SRMR values; and
performing dereverberation based on the estimated RTs of the reverberations, and recognize the command based on the estimated RTs.

16. The non-transitory machine-readable medium of claim 15, wherein the RTs relate to reverberations associated with one or more of the first, second, and third voice-enabled devices, wherein the first, second, and third voice-enable devices are coupled with each other over a communication medium including one or more of a proximity network, a cloud network, and the Internet.

17. The non-transitory machine-readable medium of claim 15, wherein the first voice-enabled device is further to convert the command into a text-to-speech (TTS) command, wherein one of the first, second, and third voice-enabled devices serves as a centralized unit positioned locally with the first, second, and third voice-enabled devices or remotely in communication over the communication medium.

18. The non-transitory machine-readable medium of claim 15, further comprising updating one or more SRMR tables based on the calculated SRMR values.

19. The non-transitory machine-readable medium of claim 15, further comprising selecting one of the second and third voice-enabled devices to issue a response to the command.

20. The non-transitory machine-readable medium of claim 15, wherein a relation between the SRMR values and the RTs is fixed, wherein the first, second, and third voice-enabled devices comprise one or more of smart speakers, laptop computers, mobile devices, smart wearable devices, smart household appliances, and smart locks, wherein each of the first, second, and third voice-enabled devices comprise one or more processors including a graphics processor co-located with an application processor on a common semiconductor package.

* * * * *